(12) United States Patent
Helfer

(10) Patent No.: US 11,460,118 B2
(45) Date of Patent: Oct. 4, 2022

(54) FLOW CONTROL SEALS

(71) Applicant: FISHER CONTROLS INTERNATIONAL LLC, Marshalltown, IA (US)

(72) Inventor: Wade J. Helfer, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/103,528

(22) Filed: Nov. 24, 2020

(65) Prior Publication Data
US 2022/0163120 A1    May 26, 2022

(51) Int. Cl.
*F16K 5/06* (2006.01)
*F16K 5/12* (2006.01)

(52) U.S. Cl.
CPC .............. *F16K 5/0689* (2013.01); *F16K 5/12* (2013.01)

(58) Field of Classification Search
CPC .......... F16K 5/0689; F16K 5/12; F16K 47/14; F16K 5/0605; F16K 47/045; F16K 47/08; Y10T 137/86743; F16L 55/02718
See application file for complete search history.

(56) References Cited

U.S. PATENT DOCUMENTS

| | | | | |
|---|---|---|---|---|
| 5,074,522 A * | 12/1991 | Reynolds | ................... | F16K 5/10 251/127 |
| 5,480,123 A * | 1/1996 | Bey | ........................... | F16K 1/22 251/127 |
| 5,758,689 A * | 6/1998 | Leinen | ................... | F16K 47/045 138/40 |
| 5,988,586 A * | 11/1999 | Boger | ..................... | F16K 47/08 138/42 |
| 10,724,643 B2 * | 7/2020 | Kuhlman | ................ | F16K 47/08 |
| 2010/0258193 A1 * | 10/2010 | Christenson | .......... | F16K 5/0605 137/1 |
| 2019/0316707 A1 * | 10/2019 | Helfer | ....................... | F16K 1/22 |

* cited by examiner

*Primary Examiner* — Hailey K. Do
(74) *Attorney, Agent, or Firm* — Hanley, Flight & Zimmerman

(57) ABSTRACT

Flow control seals are disclosed. A disclosed example seal for use with a valve includes an annular body defining an interior channel, and a closed body disposed within and covering a portion of the interior channel of the annular body, the closed body including an aperture extending therethrough to change a flow direction of fluid as the valve is opened.

23 Claims, 6 Drawing Sheets

FLOW CONTROL SEALS

FIELD OF THE DISCLOSURE

This disclosure relates generally to flow control devices and, more particularly, to flow control seals.

BACKGROUND

Ball valves are used in many common industrial applications. In operation, an amount of fluid flowing through a ball valve can be varied by rotating a ball having an aperture extending therethrough. When the ball is initially rotated from a closed position, fluid can move in an unintended or undesirable direction, thereby causing damage to the ball valve (e.g., components of the ball valve) and/or components coupled to and/or proximate the ball valve.

SUMMARY

An example seal for use with a valve includes an annular body defining an interior channel, and a closed body disposed within and covering a portion of the interior channel of the annular body, the closed body including an aperture extending therethrough to change a flow direction of fluid as the valve is opened.

An example valve includes a valve body defining an interior channel, and a seal disposed within the valve body, the seal having a closed body covering a portion of the interior channel, the closed body having an aperture extending therethrough, the aperture to change a flow direction of fluid as the valve is initially moved from a closed position to an open position.

An example method of installing a seal in a valve includes opening a valve body, the valve body defining an interior channel, placing a seal in the valve body, the seal having a closed body covering a portion of the interior channel, and aligning the seal so that an aperture extending through the closed body is positioned to change a flow direction of fluid as the valve is initially opened.

An example apparatus includes means for controlling an amount of flow of fluid, and means for controlling a direction of the flow of fluid as the means for controlling the flow of fluid is opened.

Figure 1A:
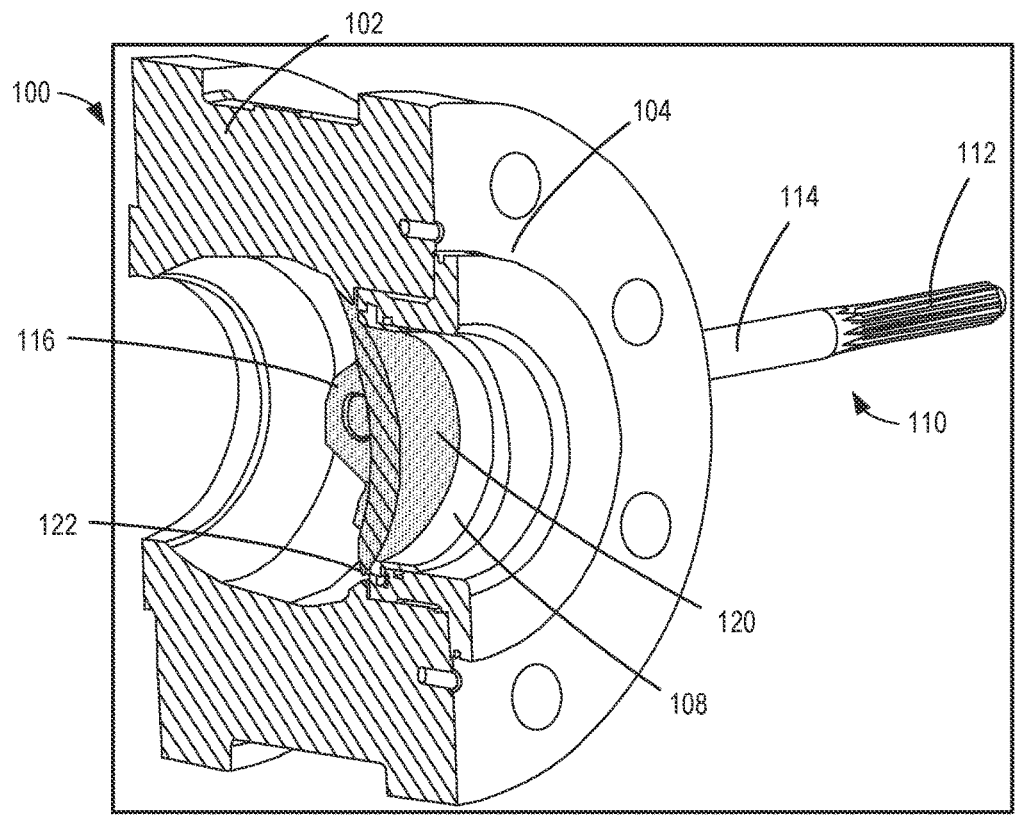
FIGS. 1A and 1B are partial cutaway views of a valve in which examples disclosed herein can be implemented.

The figures are not to scale. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Flow control seals are disclosed. Generally, when a sealing member, such as a plug or rotating ball, of a valve is initially moved from a closed position, fluid can move in an unintended or undesired direction, thereby causing damage to the valve (e.g., components of the valve) and/or components coupled to and/or proximate the valve. In other words, the fluid moving through the valve as the valve is initially opened can flow toward components of the valve at a high velocity instead of a free flow direction (e.g., a bulk general flow direction of fluid moving through a component) thereof and, as a result, the components of the valve can be subject to premature wear. This wear can be accelerated in industrial mining applications, for example.

Examples disclosed herein enable highly reliable valves by directing a flow of fluid as a valve is opened (e.g., as the valve is beginning to be opened, etc.). As a result, high pressure flows (e.g., confined high pressure flows) can be directed away from components of the valve and, instead, toward or more generally directed toward a free flow direction of the valve and/or piping coupled to the valve. Examples disclosed herein can be applied to valves (e.g., plug valves, ball valves, etc.) or any appropriate flow device (e.g., piping, conduit, etc.).

Examples disclosed herein implement a valve with a seal (e.g., a valve seal) having an annular ring or body defining an interior channel thereof. According to examples disclosed herein, an aperture (e.g., a channel) extends through a closed body (e.g., a closed portion) of the seal and the closed body covers a cross-sectional area/portion of the interior channel. The aperture is to direct a flow of fluid toward (i.e., closer toward) a free flow direction as the valve opened (e.g., when the valve is moved initially from being closed and/or in a closed state). In some examples disclosed herein, the seal is to be placed in a valve and the closed body includes and/or defines a curved portion. Examples disclosed herein can be manufactured or retrofit to field-installed fluid flow control devices.

In some examples, the seal implements a pilot hole or aperture proximate the aforementioned converging tip to facilitate flow of the fluid past the seal. In some examples, the seal includes at least two apertures that extend in different directions to direct flow in different directions. In some examples, the aforementioned curved portion is complementarily shaped to a ball of a ball valve. In other words, the curved portion can have curvature and/or geometry that closely matches an outer surface of the ball. In some examples, the seal includes a pattern or array of channels or apertures to direct the fluid toward the free flow direction. The pattern can be a honeycomb pattern, for example.

As used herein, the term "seal" refers to a component, assembly and/or device implemented to seal to another component and/or seal two other components together. As used herein, the term "free flow direction" refers to a bulk general flow direction of fluid moving through a component. Accordingly, the term "free flow direction" can refer to a longitudinal direction of a pipe, etc. As used herein, the terms "closed body" or "closed portion" refer to a material or body that is positioned within and covers a portion of an inner channel or diameter of an object.

Figure 1B:
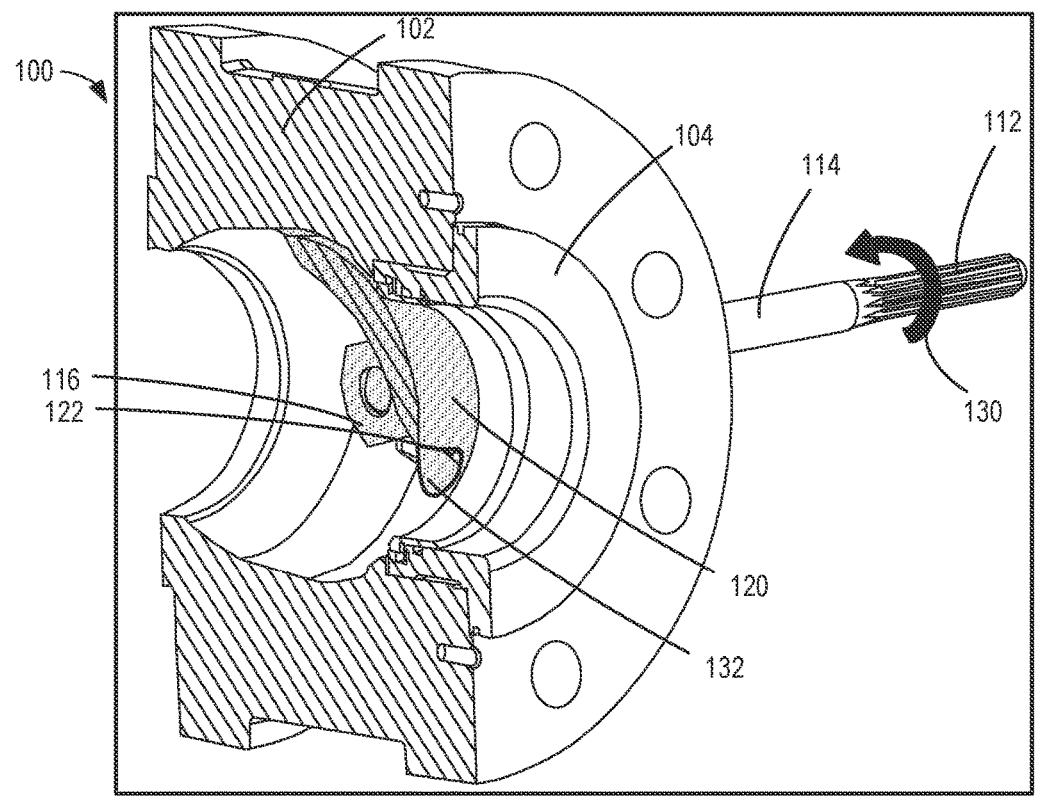

FIGS. 1A and 1B are partial cutaway views of a valve (e.g., means for controlling an amount of flow of fluid) 100 in which examples disclosed herein can be implemented. Turning to FIG. 1A, the example valve 100 is depicted in a closed state and includes a valve body 102, a retainer (e.g., a seal protector ring) 104, a seal 108 and a ball movement assembly 110. The ball movement assembly 110 includes an input (e.g., a machined shaft, etc.) 112, a stem (e.g., a rotatable stem) 114, a ball mount 116 and a ball 120 having an aperture 122 extending therethrough.

FIG. 1B depicts the example valve 100 during operation and in an open and/or partially open state. In this example, an amount of fluid flowing through the valve 100 is varied, controlled and/or adjusted based on a relative position and/or angular orientation of the aperture 122 to the valve body 102 and/or the retainer 104.

To increase an amount of fluid moving through the valve 100, the input 112 is rotated and/or moved (e.g., translationally, rotationally, etc.) along a direction generally indicated by an arrow 130. In turn, the shaft 114 is rotated, thereby causing the ball mount 116 and, thus, the ball 120 to rotate. As a result, the aperture 122 is moved relative to the retainer 104 and the valve body 102, which results in the fluid moving through the aperture 122 and a region 132 before passing through the retainer 104. In this example, the initial opening of the valve 100 (e.g., when the ball 120 is first moved to a slight opening) causes fluid to be directed as a confined/narrow flow to the valve body 102 of the valve 100, as well as components (e.g., piping, joints, flow measuring devices, etc.) coupled to the valve 100. This flow can cause premature damage of the valve 100 and/or the components coupled to the valve 100. In contrast, examples disclosed herein orient the flow to avoid, reduce and/or eliminate wear caused by the fluid during opening of the valve 100 (e.g., initial opening of the valve 100).

Figure 2:
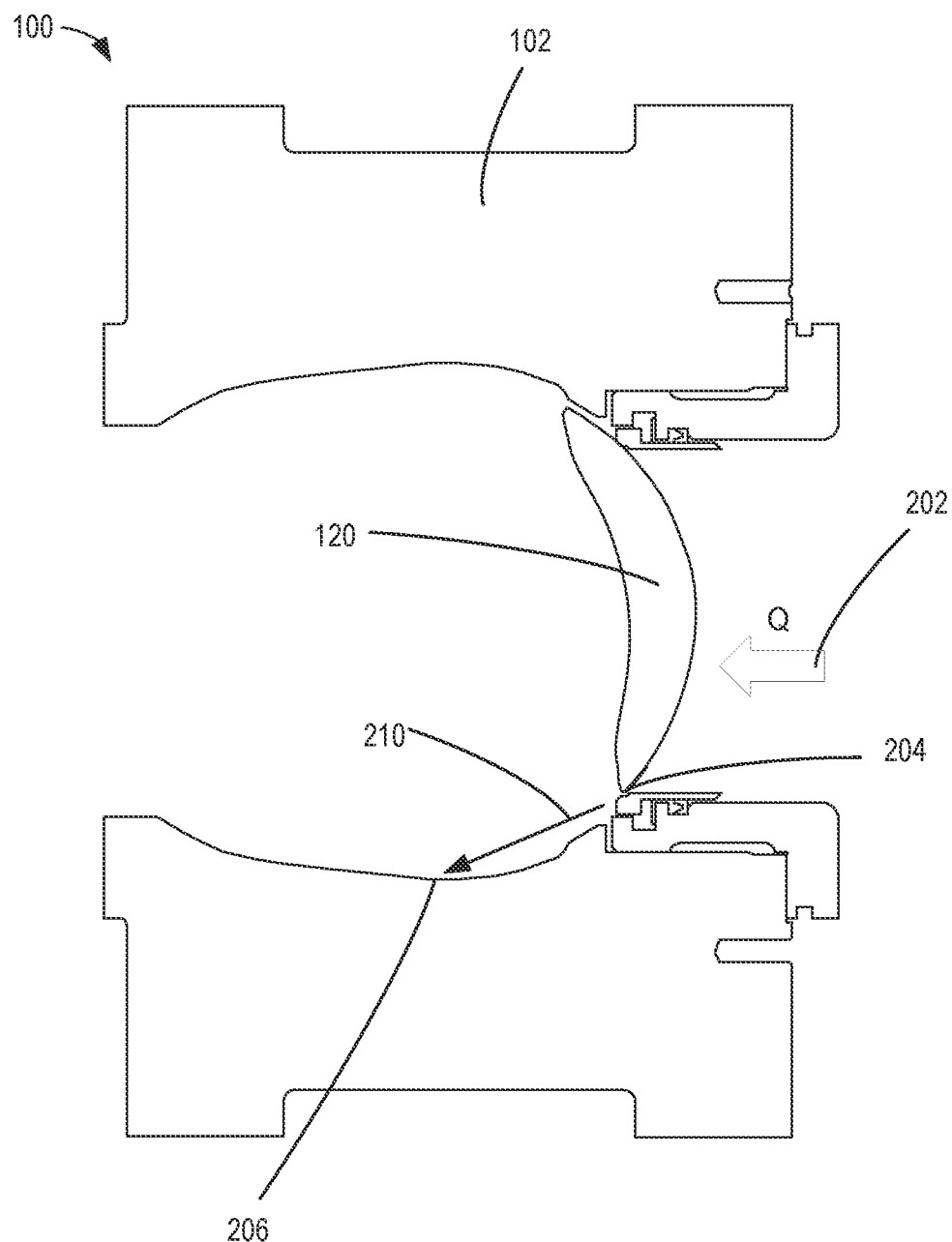
FIG. 2 is a cross-sectional view of the valve of FIGS. 1A and 1B.

FIG. 2 is a cross-sectional view of the valve 100 of FIGS. 1A and 1B. As can be seen in the example of FIG. 2, the ball 120 is depicted at a slightly opened state. In the illustrated example, fluid is moving toward the ball 120, as generally indicated by an arrow 202, and into a region 204 defined by the rotational displacement of the ball 120. In the illustrated, example, the arrow 202 also represents a free flow direction of the aforementioned fluid. As a result of the ball 120 being rotated in a relatively slight displacement from its closed position and/or orientation, the fluid is directed toward a surface 206 of the valve body 102, as generally indicated by an arrow 210, thereby causing premature wear of the valve body 102 and/or the valve 100. In particular, the flow directed toward the surface 206 can have a relatively large force and velocity when the pressure of the fluid provided to an inlet of the valve 100 is relatively high and, thus, can damage the valve body over a relatively short period of time.

In contrast, examples disclosed herein can be implemented to redirect the flow of fluid away with a high velocity/force from the surface 206, for example. Examples disclosed herein can redirect the flow toward (i.e., closer toward) the aforementioned free flow direction to increase a service life of the valve 100.

Figure 3:
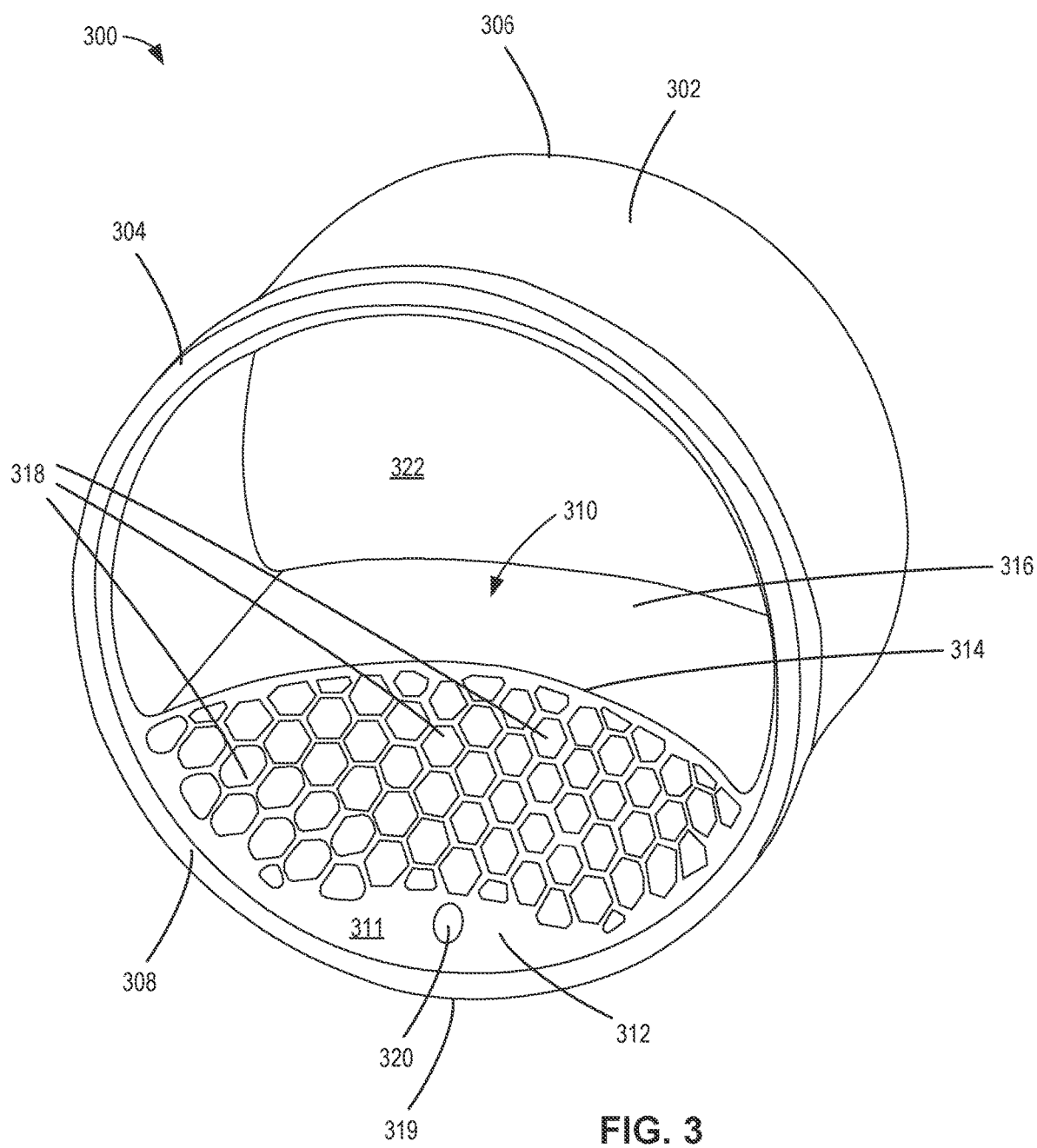
FIG. 3 is a perspective view of an example seal in accordance with teachings of this disclosure.

FIG. 3 is a perspective view of an example flow control seal (e.g., valve seal, a seal collar, means for controlling a direction of a flow of fluid) 300 in accordance with teachings of this disclosure. The seal 300 of the illustrated example includes an annular body (e.g., an annular cylinder, an annular ring, etc.) 302, and a flange or lip (e.g., an annular flange, an annular lip, etc.) 304. Further, the seal 300 includes a first end 306 and a second 308. The example seal 300 also includes a curved portion (e.g., a concave wedge portion, a curved section, a curved wedge portion, a hemispherical curved portion, a wedge protrusion, etc.) 310 which, in turn, includes a curved surface (e.g., a hemispherical curved surface, a circular portion, a concave surface, a partial hemisphere surface, etc.) 312 and a curved edge 314 defined by a curved inner wall 316. In this example, the curved portion 310 defines a closed body (e.g., a closed interior portion, a closed interior diameter portion, a closed portion, a closed section) 311 that is disposed within an interior (e.g., an inner diameter) of the valve body 102. In particular, the closed body 311 covers a portion of an interior channel and/or diameter defined by the annular body 302. The seal 300 of the illustrated example also includes apertures or channels 318, which are positioned on the curved portion 310 and arranged in a honeycomb pattern. Further, in this example, the curved surface 312 defines a distal tip (e.g., a converging distal tip, converging tip, etc.) 319. In some examples, the seal 300 includes a pilot aperture 320 to enable fluid flow and/or pressure relief when the valve 100 is initially opened.

To facilitate contact to the ball 120, the surface 312 and/or the curved edge 314 are curved along a longitudinal direction of the seal 300 and complementarily shaped to the ball 120 in this example. Further, in the illustrated example, the surface 312 exhibits a scalloped shaped and openly faces toward the ball 120. In this example, the surface 312 contacts (e.g., seals) the ball 120. In other examples, the surface 312 is offset from the ball 120 when the seal 300 is installed in the valve 100. However, in other examples, the surface 312 is to contact the ball 120 for at least one orientation of the ball 120 when the seal 300 is installed in the valve 100 (e.g., to define a seal interface). In this example, the curved portion 310 and the surface 312 are curved and/or contoured in multiple directions, thereby defining a relatively complex geometry and/or shape. In some examples, a sealing interface and/or seal is formed between the seal 300 and the ball 120.

To redirect flow as the ball 120 is moved into an open position (e.g., begun to move into the open position, initially moved from a closed position, etc.), fluid is directed into the example apertures 318. In this example, the fluid first flows and/or contacts the distal tip 319 as the valve 100 is first opened. As the valve is opened further from its closed position, the fluid flows through the apertures 318, which are hexagonal shaped (e.g., hexagonal openings) and arranged in a honeycomb pattern in this example. In turn, the fluid is directed toward (i.e., closer toward) a free flow direction of the valve 100 and/or a conduit or pipe coupled thereto by the apertures 318. As a result, the valve 100 has a relatively long service life. In some examples, the pilot hole 320 also directs flow of the fluid as the valve 100 is first opened. As the valve 100 is further opened, a significant portion of the fluid flows through the seal 300 in an inner portion (e.g., an opening portion, an inner diameter opening portion, etc.) 322 of the seal 300 defined by the curved wall 316 and an interior surface of the annular body 302. In other words, as the valve 100 is further opened, a significant portion of the fluid flows through a larger cross-sectional opening of the seal 300. In this example, the annular body 302 is integral with closed body 311. Additionally or alternatively, the closed body 311 extends from the annular body 302.

While the apertures 318 are hexagonally shaped in a hexagonal or honeycomb array/pattern in this example, any appropriate cross-sectional profile (e.g., circular, square, triangular, rectangular, ellipsoid, etc.) and/or pattern arrangement (e.g., circular arrangement of openings, grid arrangement, etc.) can be implemented instead. In some examples, the apertures 318 extend along a longitudinal direction (e.g., a flow-wise direction) of the seal 300 and/or a pipe fluidly coupled to the valve 100. In some other examples, however, the apertures 318 extend in a different direction from (e.g., angled from) the longitudinal direction of the seal 300 and/or the pipe fluidly coupled to the valve 100. In other examples, only one of the apertures 318 is implemented to direct flow through the seal 300.

In some examples, the seal 300 is at least partially composed of a metal. However, any appropriate material can be implemented instead, including, but not limited to stainless steel (e.g., stainless steel 316 alloy or any other appropriate steel alloy), plastic, nitronic 60, Ultimet® alloy, aluminum, etc. In some examples, the seal 300 is molded, die-cast, 3-D printed and/or machined. Additionally or alternatively, the seal 300 is at least partially composed of or includes a component with a compressible elastomer (e.g., a rubber material, a compressible gasket, etc.). In some examples, the seal 300 is positioned external to the valve 100 (e.g., a junction where the valve 100 and a pipe meet, etc.). In some examples, the apertures 318 extend along a different direction from a longitudinal axis of the annular body 302.

Figure 4:
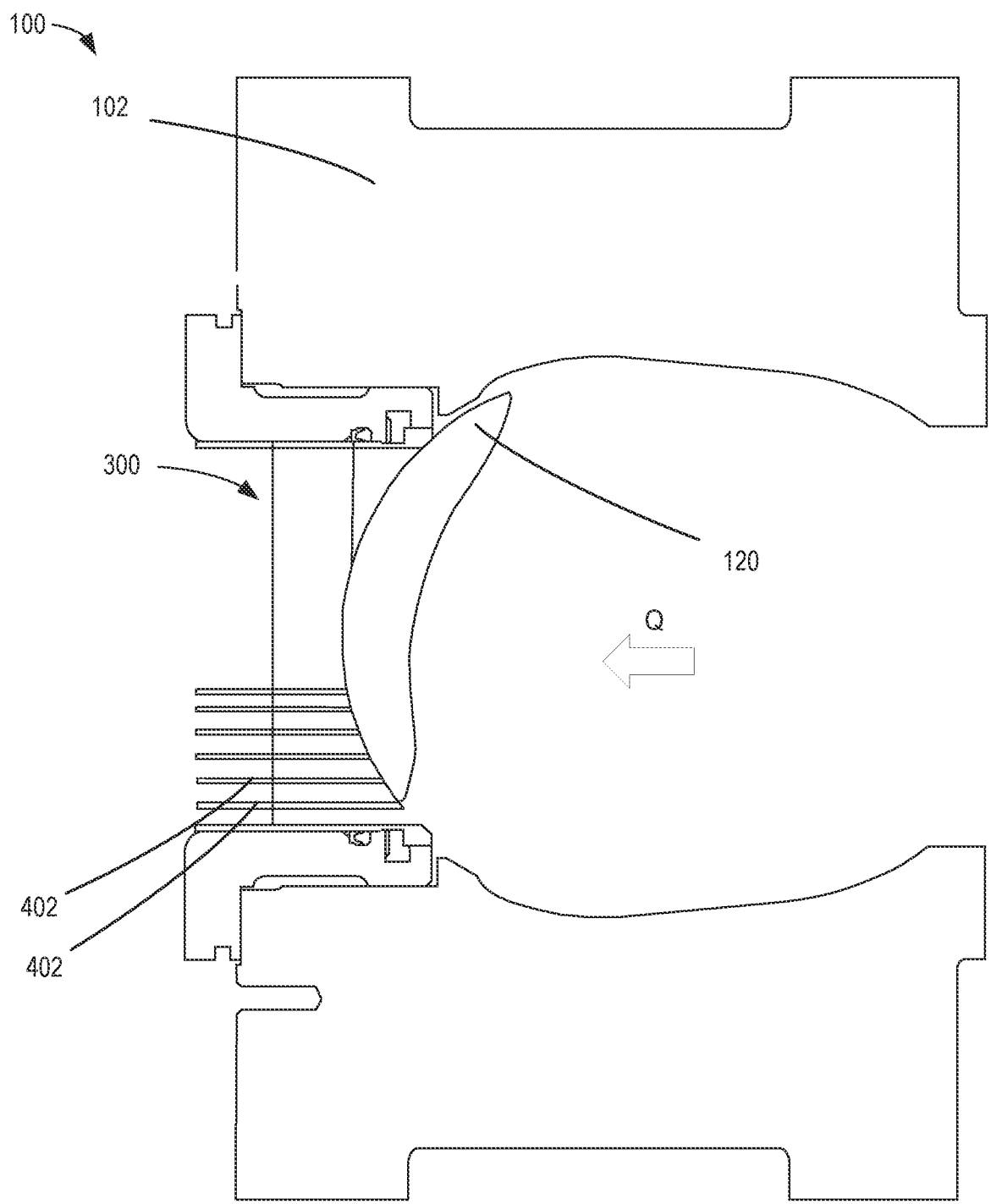
FIG. 4 is a cross-sectional view of the valve of FIGS. 1A-2 with the example seal of FIG. 3 installed.

FIG. 4 is a cross-sectional view of the valve 100 of FIGS. 1A-1B and 2 with the example seal 300 of FIG. 3 installed. In the illustrated view of FIG. 4, fluid is moving in the opposite direction from that shown in FIG. 2 and the ball 120 is rotated relative to the valve body 102. In particular, the ball 120 is rotated such that the valve 100 is partially open (e.g., 15 degrees from the closed position of the valve 100). In this example, the seal 300 causes the fluid to flow along a direction generally indicated by lines 402 as the valve 100 is initially opened (e.g., initially displaced from a closed position of the valve 100). By redirecting the fluid closer to a free flow direction, the valve 100 and/or components associated with and/or coupled to the valve 100 can have a relatively long service life.

Figure 5B:
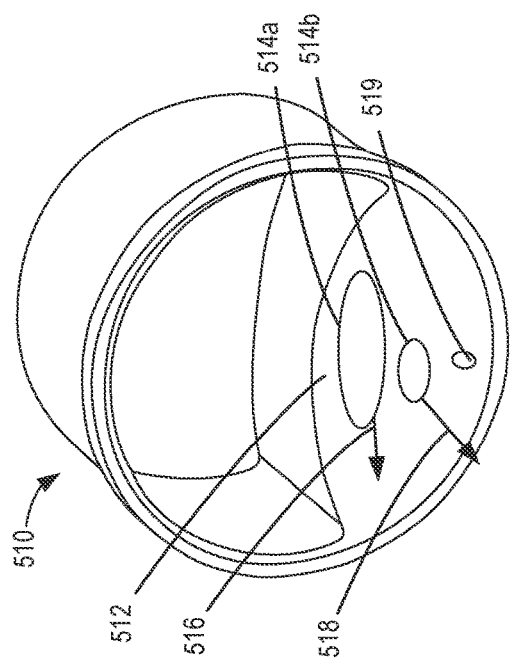
FIGS. 5A-5D depict alternative example seals that can be implemented in examples disclosed herein.
Figure 5D:
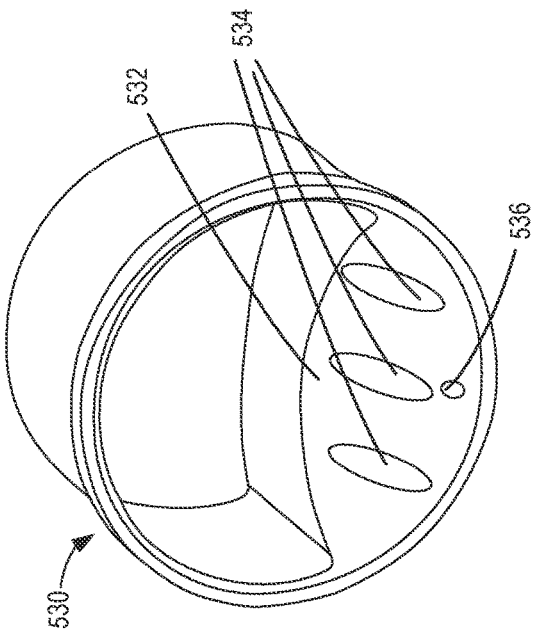
Figure 5A:
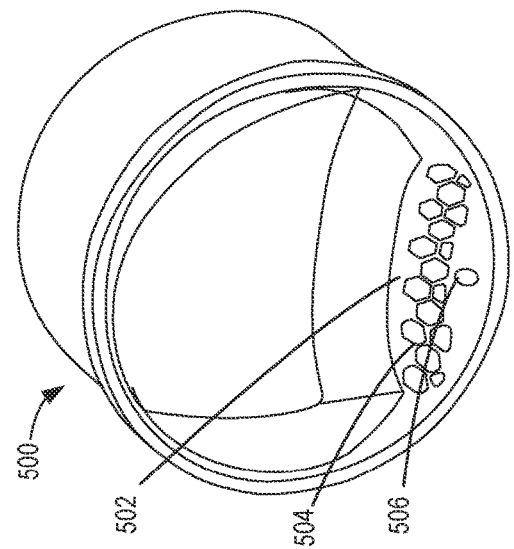

FIGS. 5A-5D depict alternative example seals 500, 510, 520, 530 that can be implemented in examples disclosed herein. Turning to FIG. 5A, the example seal 500 is shown. The example seal 500 is similar to the seal 300 shown in FIGS. 3 and 4, but has a curved portion 502 with two rows of apertures or channels 504. In some other examples, only one row of the apertures 504 is implemented. Additionally or alternatively, a pilot hole 506 is implemented instead.

FIG. 5B depicts the example seal 510 with a curved portion 512 having apertures 514 (hereinafter apertures 514a, 514b, etc.) that are oriented in different directions from one another (e.g., extend in longitudinal directions that are different from one another). In particular, the aperture 514a has a flow direction that is oriented in a direction generally indicated by an arrow 516 while the aperture 514b has a corresponding flow direction that is oriented in a direction generally indicated by an arrow 518. In this example, the aperture 514a has a larger size than the aperture 514b. In other examples, the apertures 514a, 514b have a substantially identical size (e.g., overall widths within 5% of one another). In some examples, the seal 510 includes a pilot hole 519.

While two of the apertures 514 are implemented in this example, any appropriate number of the apertures 514 can be implemented instead (e.g., three, four, five, six, seven, eight, nine, ten, fifteen, twenty, forty, fifty, one hundred, etc.). In some such examples, at least two of the apertures 514 are oriented in the same direction.

Figure 5C:
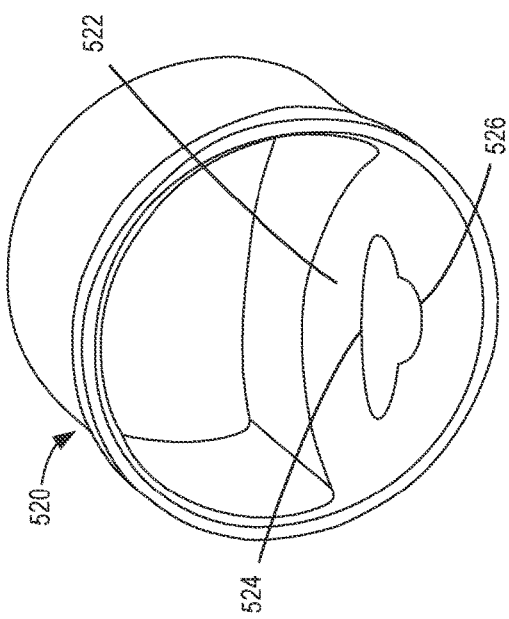

Turning to FIG. 5C, the example seal 520 is depicted. The seal 520 of the illustrated example includes a curved portion 522 having a slot (e.g., a slot-shaped cross-sectional profile) 524 extending laterally across and through the seal 520. In some examples, a pilot portion (e.g., a curved pilot opening) 526 is implemented. In this example, the pilot portion 526 is integral with the slot 524, thereby defining a combined opening resembling a keyhole, for example.

FIG. 5D illustrates the example seal 530. The seal 530 of the illustrated example includes a curved portion 532 with slots 534, which extend in a different direction from the slot 524 shown in FIG. 5C. In some examples, a pilot hole 536 is implemented.

Any features of the examples shown in connection with FIGS. 3 and 5A-5D can be combined. For example, the slot opening 524 can be combined with and/or surrounded by the apertures 318 shown in FIG. 3.

Figure 6:
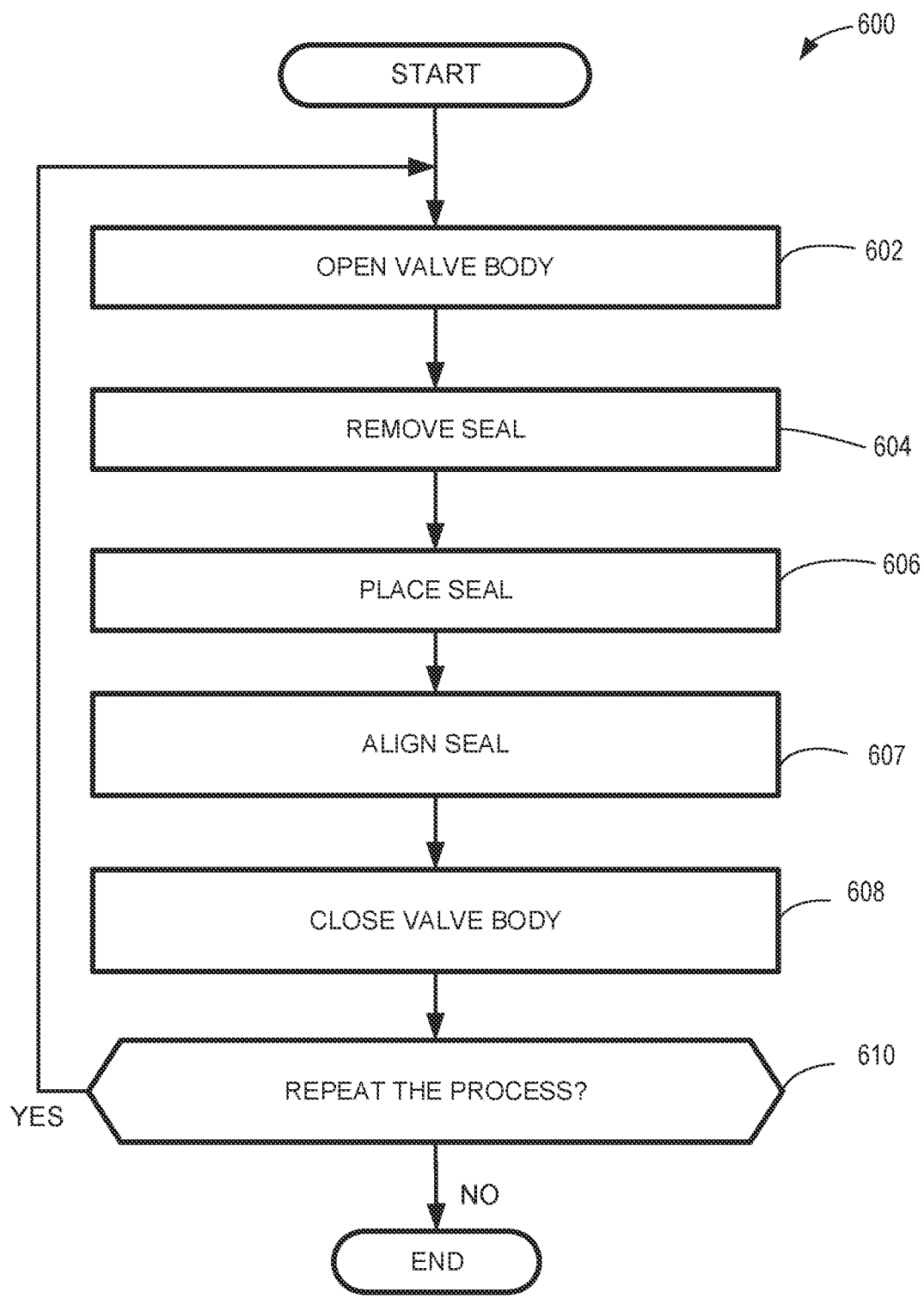
FIG. 6 is a flowchart representative of an example method to manufacture, install and/or retrofit examples disclosed herein.

FIG. 6 is a flowchart representative of an example method 600 to manufacture, install and/or retrofit examples disclosed herein. In this example, the valve 100 is being retrofit to include the seal 300. In other examples, the seal 300 is being assembled onto a valve during a manufacturing process.

At block 602, a valve body 102 of the valve 100 is opened. In this example, the valve body 102 is opened (e.g., via removing fasteners) to expose a seal (e.g., a previously installed seal) to be replaced. In other examples, the seal is external to the valve body 102 and/or the valve 100.

At block 604, the aforementioned seal to be replaced and within the valve body 102 is removed. In some examples, this seal is removed when the valve 100 is being maintained and/or serviced (e.g., during a service interval).

At block 606, the example seal 300 is placed in the valve body 102. In this example, the seal 300 can be integral with a retainer (e.g., the retainer acts a seal) or assembled with a retainer.

At block 607, in some examples, the seal 300 is aligned (e.g., rotationally aligned) to ensure that the curved portion 310 is positioned proximate a region in which the ball 120 first opens. In particular, the seal 300 is aligned so that at least one aperture is positioned to change a flow direction of fluid when the valve 100 is initially opened. In some examples, the seal 300 is rotated relative to the region in which the ball first opens via a marker or other physical feature (e.g., an alignment tab or clocking feature).

At block 608, the valve body 102 is closed. In this example, the valve body 102 is sealed shut (e.g., via at least one compressible gasket) with use of at least one mechanical fastener.

At block 610, it is determined whether to repeat the process. If the process is to be repeated (block 610), control of the process returns to block 602. Otherwise, the process ends. The determination may be based on whether there are additional valves to be manufactured or retrofitted.

From the foregoing, it will be appreciated that example methods, apparatus and articles of manufacture have been disclosed that enable valves with a relatively long service life. Examples disclosed herein can also enable a relatively high reliability for applications with reversible flow directions.

Example 1 includes a seal for use with a valve. The seal includes an annular body defining an interior channel, and a closed body disposed within and covering a portion of an interior of the annular body, the closed body including an aperture extending therethrough to change a flow direction of fluid as the valve is opened.

Example 2 includes the seal as defined in example 1, further including a pilot aperture proximate a converging tip of the closed body.

Example 3 includes the seal as defined in example 1, wherein the aperture is a first aperture defining a first direction of flow, and further including a second aperture defining a second direction of flow different from the first direction of flow.

Example 4 includes the seal as defined in example 1, wherein the closed body includes a curved portion.

Example 5 includes the seal as defined in example 4, wherein the valve is a ball valve, and wherein the curved portion is complementarily shaped to a ball of the ball valve.

Example 6 includes the seal as defined in example 1, wherein the aperture is to direct the fluid toward a free flow direction.

Example 7 includes the seal as defined in example 1, wherein the aperture extends along a direction of a longitudinal axis of the annular body.

Example 8 includes the seal as defined in example 1, wherein the aperture is one of an array of hexagonal openings extending through the closed body.

Example 9 includes valve including a valve body defining an interior channel, and a seal disposed within the valve body, the seal having a closed body covering a portion of the interior channel, the closed body having an aperture extending therethrough, the aperture to change a flow direction of fluid as the valve is initially moved from a closed position to an open position.

Example 10 includes the valve as defined in example 9, wherein the aperture extends through a curved portion of the closed body.

Example 11 includes the valve as defined in example 10, further including a pilot aperture proximate a converging tip of the curved portion.

Example 12 includes the valve as defined in example 9, wherein the aperture is one of a honeycomb pattern of apertures.

Example 13 includes the valve as defined in example 9, wherein the aperture is a first aperture defining a first direction of flow, and further including a second aperture of the closed body defining a second direction of flow different from the first direction of flow.

Example 14 includes the valve as defined in example 9, wherein the aperture includes a slot-shaped cross-sectional profile.

Example 15 includes the valve as defined in example 9, wherein the valve includes a ball valve, and further including a curved portion of the closed body, wherein the curved portion is complementarily shaped to a ball of the ball valve.

Example 16 includes a method of installing a seal in a valve. The method includes opening a valve body, the valve body defining an interior channel, placing a seal in the valve body, the seal having a closed body covering a portion of the interior channel, and aligning the seal so that an aperture extending through the closed body is positioned to change a flow direction of fluid as the valve is initially opened.

Example 17 includes the method as defined in example 16, further including removing a previously installed seal from the valve body, and placing the seal with the aperture within the valve body.

Example 18 includes the method as defined in example 16, wherein aligning the seal includes rotating the seal to an orientation in which the aperture is proximate a region in which a ball of the valve first opens.

Example 19 includes the method as defined in example 16, wherein the valve is a ball valve, and wherein aligning the seal includes placing a curved surface of the seal proximate a ball of a ball valve, wherein the curved surface is complementarily shaped to the ball.

Example 20 includes an apparatus having means for controlling an amount of flow of fluid, and means for controlling a direction of the flow of fluid as the means for controlling the flow of fluid is opened.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of seals for valves, examples disclosed herein can be applied to any appropriate application involving fluid flow applications.

The following claims are hereby incorporated into this Detailed Description by this reference, with each claim standing on its own as a separate embodiment of the present disclosure.

What is claimed is:

1. A seal for use with a valve, the seal comprising:
   an annular body defining an interior channel that extends longitudinally between a first end of the seal and a second end of the seal opposite the first end, the interior channel at least partially defined by an interior surface of the annular body; and
   a closed body disposed within and covering a portion of the interior channel of the annular body, the closed body extending between the first and second ends of the seal, the closed body including:
     a pattern of apertures extending therethrough to change a flow direction of fluid as the valve is opened, ones of the pattern of apertures extending along a first longitudinal direction, and a pilot aperture positioned proximate a converging tip of the closed body and away from the pattern of apertures, the pilot aperture extending along a second longitudinal direction different from the first longitudinal direction.

2. The seal as defined in claim 1, wherein the pattern of apertures includes a first aperture defining a first direction of flow and a second aperture defining a second direction of flow different from the first direction of flow.

3. The seal as defined in claim 1, wherein the pattern of apertures is to direct the fluid toward a free flow direction.

4. The seal as defined in claim 1, wherein the ones of the pattern of apertures extend along a direction of a longitudinal axis of the annular body.

5. The seal as defined in claim 1, wherein the pattern of apertures is an array of hexagonal openings extending through the closed body.

6. The seal as defined in claim 1, wherein the pilot aperture is to enable the fluid to flow therethrough as the seal is initially opened such that the fluid is to flow through the pilot aperture prior to flowing to any aperture of the pattern of apertures.

7. The seal as defined in claim 1, wherein the annular body includes an annular ring or cylinder.

8. The seal as defined in claim 1, wherein the closed body includes a curved portion that converges at the converging tip.

9. The seal as defined in claim 8, wherein the valve is a ball valve, and wherein the curved portion is complementarily shaped to a ball of the ball valve.

10. The seal as defined in claim 1, wherein ones of the pattern of apertures define a first direction of flow and the pilot aperture defines a second direction of flow different from the first direction of flow.

11. The seal as defined in claim 10, wherein the first direction of flow is parallel to a free flow direction of the valve.

12. The seal as defined in claim 10, wherein the second direction of flow is parallel to a free flow direction of the valve.

13. A valve comprising:
a valve body defining an interior channel; and
a seal disposed within the valve body, the seal including:
an annular body defining an opening portion extending longitudinally between a first end of the seal and a second end of the seal opposite the first end, the opening portion at least partially defined by an interior surface of the annular body, and
a closed body within the annular body and extending between the first and second ends of the seal, the closed body covering a portion of the opening portion, the closed body having:
a pattern of apertures extending therethrough, the pattern of apertures to change a flow direction of fluid as the valve is initially moved from a closed position to an open position, ones of the pattern of apertures extending along a first longitudinal direction, and
a pilot aperture positioned proximate a converging tip of the closed body and away from the pattern of apertures, the pilot aperture extending along a second longitudinal direction different from the first longitudinal direction.

14. The valve as defined in claim 13, wherein the pattern of apertures extends through a curved portion of the closed body.

15. The valve as defined in claim 13, wherein the pattern of apertures is a honeycomb pattern of apertures of the closed body.

16. The valve as defined in claim 13, wherein ones of the pattern of apertures define a first direction of flow, and the pilot aperture defines a second direction of flow different from the first direction of flow.

17. The valve as defined in claim 13, wherein at least one aperture of the pattern of apertures includes a slot-shaped cross-sectional profile.

18. The valve as defined in claim 13, wherein the valve includes a ball valve, and further including a curved portion of the closed body, wherein the curved portion is complementarily shaped to a ball of the ball valve.

19. A method of installing a seal in a valve, the method comprising:
opening a valve body, the valve body defining an interior channel;
placing the seal in the valve body, the seal including:
an annular body defining an opening portion longitudinally extending between a first end of the seal and a second end of the seal opposite the first end, the opening portion at least partially defined by an interior surface of the annular body, and
a closed body within the annular body and covering a portion of the opening portion, the closed body extending between the first and second ends of the seal, the closed body including a pattern of apertures extending therethrough and a pilot aperture positioned proximate a converging tip of the closed body and away from the pattern of apertures ones of the pattern of apertures extending along a first longitudinal direction and the pilot aperture extending along a second longitudinal direction different from the first longitudinal direction; and
aligning the seal so that the pattern of apertures extending through the closed body is positioned to change a flow direction of fluid as the valve is initially opened.

20. The method as defined in claim 19, further including:
removing a previously installed seal from the valve body; and
placing the seal with the pattern of apertures and the pilot aperture within the valve body.

21. The method as defined in claim 19, wherein aligning the seal includes rotating the seal to an orientation in which the pilot aperture is proximate a region in which a ball of the valve first opens.

22. The method as defined in claim 19, wherein the valve is a ball valve, and wherein aligning the seal includes placing a curved surface of the seal proximate a ball of a ball valve, wherein the curved surface is complementarily shaped to the ball.

23. An apparatus comprising:
means for controlling an amount of flow of fluid; and
means for controlling a direction of the flow of fluid as the means for controlling the flow of fluid is opened, wherein the means for controlling a direction of the flow of fluid includes:
an annular body defining an opening portion at least partially defined by an interior surface of the annular body, and
a closed body within the annular body, the closed body including:
a pattern of apertures extending therethrough to change a flow direction of fluid as the apparatus is opened, ones of the pattern of apertures extending along a first longitudinal direction; and a pilot aperture positioned proximate a converging tip of the closed body and away from the pattern of apertures, the pilot aperture extending along a second longitudinal direction different from the first longitudinal direction.

\* \* \* \* \*